US010714091B2

(12) United States Patent
Bonforte (10) Patent No.: US 10,714,091 B2
(45) Date of Patent: *Jul. 14, 2020

(54) SYSTEMS AND METHODS TO PRESENT VOICE MESSAGE INFORMATION TO A USER OF A COMPUTING DEVICE

(71) Applicant: OATH INC., New York, NY (US)

(72) Inventor: Jeffrey Bonforte, San Francisco, CA (US)

(73) Assignee: OATH INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/148,042

(22) Filed: Oct. 1, 2018

(65) Prior Publication Data

US 2019/0035400 A1 Jan. 31, 2019

Related U.S. Application Data

(63) Continuation of application No. 15/627,524, filed on Jun. 20, 2017, now Pat. No. 10,089,986, which is a
(Continued)

(51) Int. Cl.
*G10L 15/26* (2006.01)
*H04W 4/21* (2018.01)
(Continued)

(52) U.S. Cl.
CPC .......... *G10L 15/265* (2013.01); *G06Q 10/107* (2013.01); *G10L 15/26* (2013.01);
(Continued)

(58) Field of Classification Search
CPC .................................................. G10L 15/265
(Continued)

(56) References Cited

U.S. PATENT DOCUMENTS 5,396,647 A 3/1995 Thompson et al.
5,610,915 A 3/1997 Elliott et al.
(Continued)

FOREIGN PATENT DOCUMENTS

CN 101351818 1/2009
EP 0944002 9/1999
(Continued)

OTHER PUBLICATIONS

"OpenSocial Specification v0.9", OpenSocial and Gadgets Specification Group, Apr. 2009.
(Continued)

*Primary Examiner* — Susan I McFadden
(74) *Attorney, Agent, or Firm* — James J. DeCarlo; Greenberg Traurig, LLP (57) ABSTRACT

Systems and methods to process and/or present information relating to voice messages for a user that are received from other persons. In one embodiment, a method implemented in a data processing system includes: receiving first data associated with prior communications or activities for a first user on a mobile device; receiving a voice message for the first user; transcribing the voice message using the first data to provide a transcribed message; and sending the transcribed message to the mobile device for display to the user.

20 Claims, 5 Drawing Sheets

Related U.S. Application Data continuation of application No. 14/634,111, filed on Feb. 27, 2015, now Pat. No. 9,685,158, which is a continuation of application No. 13/528,693, filed on Jun. 20, 2012, now Pat. No. 8,972,257.

(60) Provisional application No. 61/499,643, filed on Jun. 21, 2011.

(51) Int. Cl.

| | |
|---|---|
| *G06Q 10/10* | (2012.01) |
| *H04M 1/725* | (2006.01) |
| *H04M 3/533* | (2006.01) |
| *G10L 15/30* | (2013.01) |
| *H04L 29/08* | (2006.01) |
| *H04M 3/493* | (2006.01) |

(52) U.S. Cl.
CPC ............ *G10L 15/30* (2013.01); *H04L 67/306* (2013.01); *H04M 1/7255* (2013.01); *H04M 1/72552* (2013.01); *H04M 3/533* (2013.01); *H04M 3/53333* (2013.01); *H04W 4/21* (2018.02); *H04M 3/4931* (2013.01); *H04M 2201/40* (2013.01); *H04M 2203/2038* (2013.01); *H04M 2203/253* (2013.01); *H04M 2203/551* (2013.01)

(58) Field of Classification Search
USPC ........................................................ 704/235
See application file for complete search history.

(56) References Cited

U.S. PATENT DOCUMENTS

| | | | |
|---|---|---|---|
| 5,966,714 | A | 10/1999 | Huang et al. |
| 6,020,884 | A | 2/2000 | MacNaughton et al. |
| 6,285,999 | B1 | 9/2001 | Page |
| 6,385,644 | B1 | 5/2002 | Devine et al. |
| 6,405,197 | B2 | 6/2002 | Gilmour |
| 6,484,196 | B1 | 11/2002 | Maurille |
| 6,510,453 | B1 | 1/2003 | Apfel et al. |
| 6,560,620 | B1 | 5/2003 | Ching |
| 6,594,654 | B1 | 7/2003 | Salam et al. |
| 6,615,348 | B1 | 9/2003 | Gibbs |
| 6,714,967 | B1 | 3/2004 | Horvitz |
| 6,721,748 | B1 | 4/2004 | Knight et al. |
| 6,816,850 | B2 | 11/2004 | Culliss |
| 6,832,245 | B1 | 12/2004 | Isaacs et al. |
| 6,931,419 | B1 | 8/2005 | Lindquist |
| 6,952,805 | B1 | 10/2005 | Tafoya et al. |
| 6,965,918 | B1 | 11/2005 | Arnold et al. |
| 6,996,777 | B2 | 2/2006 | Hiipakka |
| 7,003,724 | B2 | 2/2006 | Newman |
| 7,058,892 | B1 | 6/2006 | MacNaughton et al. |
| 7,076,533 | B1 | 7/2006 | Knox et al. |
| 7,085,745 | B2 | 8/2006 | Klug |
| 7,103,806 | B1 | 9/2006 | Horvitz |
| 7,181,518 | B1 | 2/2007 | Matsumoto et al. |
| 7,185,065 | B1 | 2/2007 | Holtzman et al. |
| 7,187,932 | B1 | 3/2007 | Barchi |
| 7,246,045 | B1 | 7/2007 | Rappaport et al. |
| 7,272,637 | B1 | 9/2007 | Himmelstein |
| 7,289,614 | B1 | 10/2007 | Twerdahl et al. |
| 7,328,242 | B1 | 2/2008 | McCarthy et al. |
| 7,333,976 | B1 | 2/2008 | Auerbach et al. |
| 7,359,894 | B1 | 4/2008 | Liebman et al. |
| 7,383,307 | B2 | 6/2008 | Kirkland et al. |
| 7,444,323 | B2 | 10/2008 | Martinez et al. |
| 7,454,464 | B2 | 11/2008 | Puthenkulam et al. |
| 7,475,109 | B1 | 1/2009 | Fletcher et al. |
| 7,475,113 | B2 | 1/2009 | Stolze |
| 7,512,788 | B2 | 3/2009 | Choi et al. |
| 7,512,814 | B2 | 3/2009 | Chen et al. |
| 7,536,384 | B2 | 5/2009 | Venkataraman et al. |
| 7,539,676 | B2 | 5/2009 | Aravamudan et al. |
| 7,580,363 | B2 | 8/2009 | Sorvari et al. |
| 7,593,995 | B1 | 9/2009 | He et al. |
| 7,606,860 | B2 | 10/2009 | Puthenkulam et al. |
| 7,620,407 | B1 | 11/2009 | Donald et al. |
| 7,624,103 | B2 | 11/2009 | Wiegering et al. |
| 7,627,598 | B1 | 12/2009 | Burke |
| 7,634,463 | B1 | 12/2009 | Katragadda et al. |
| 7,639,157 | B1 | 12/2009 | Whitley et al. |
| 7,653,695 | B2 | 1/2010 | Flury et al. |
| 7,685,144 | B1 | 3/2010 | Katragadda |
| 7,692,653 | B1 | 4/2010 | Petro et al. |
| 7,698,140 | B2 | 4/2010 | Bhardwaj et al. |
| 7,702,730 | B2 | 4/2010 | Spataro et al. |
| 7,707,249 | B2 | 4/2010 | Spataro et al. |
| 7,707,509 | B2 | 4/2010 | Naono et al. |
| 7,716,140 | B1 | 5/2010 | Nielsen et al. |
| 7,720,916 | B2 | 5/2010 | Fisher et al. |
| 7,724,878 | B2 | 5/2010 | Timmins et al. |
| 7,725,492 | B2 | 5/2010 | Sittig et al. |
| 7,743,051 | B1 | 6/2010 | Kashyap et al. |
| 7,752,081 | B2 | 7/2010 | Calabria |
| 7,756,895 | B1 | 7/2010 | Emigh |
| 7,756,935 | B2 | 7/2010 | Gaucas |
| 7,761,436 | B2 | 7/2010 | Norton et al. |
| 7,788,260 | B2 | 8/2010 | Lunt et al. |
| 7,805,492 | B1 | 9/2010 | Thatcher et al. |
| 7,818,396 | B2 | 10/2010 | Dolin et al. |
| 7,827,208 | B2 | 11/2010 | Bosworth et al. |
| 7,827,265 | B2 | 11/2010 | Cheever et al. |
| 7,831,692 | B2 | 11/2010 | French et al. |
| 7,836,045 | B2 | 11/2010 | Schachter |
| 7,836,134 | B2 | 11/2010 | Pantalone |
| 7,849,141 | B1 | 12/2010 | Bellegarda et al. |
| 7,849,142 | B2 | 12/2010 | Clegg et al. |
| 7,853,602 | B2 | 12/2010 | Gorti et al. |
| 7,853,881 | B1 | 12/2010 | Aly Assal et al. |
| 7,865,562 | B2 | 1/2011 | Nesbitt et al. |
| 7,870,197 | B2 | 1/2011 | Lewis et al. |
| 7,899,806 | B2 | 3/2011 | Aravamudan et al. |
| 7,899,871 | B1 | 3/2011 | Kumar et al. |
| 7,908,647 | B1 | 3/2011 | Polis et al. |
| 7,925,690 | B2 | 4/2011 | Smith et al. |
| 7,930,430 | B2 | 4/2011 | Thatcher et al. |
| 7,949,611 | B1 | 5/2011 | Nielsen et al. |
| 7,949,627 | B2 | 5/2011 | Aravamudan et al. |
| 7,970,832 | B2 | 6/2011 | Perry, Jr. et al. |
| 7,979,569 | B2 | 7/2011 | Eisner et al. |
| 7,991,764 | B2 | 8/2011 | Rathod |
| 7,996,456 | B2 | 8/2011 | Gross |
| 8,005,806 | B2 | 8/2011 | Rupp et al. |
| 8,032,598 | B1 | 10/2011 | He et al. |
| 8,055,715 | B2 | 11/2011 | Bensky et al. |
| 8,073,928 | B2 | 12/2011 | Dolin et al. |
| 8,086,676 | B2 | 12/2011 | Palahnuk et al. |
| 8,086,968 | B2 | 12/2011 | McCaffrey et al. |
| 8,112,437 | B1 | 2/2012 | Katragadda et al. |
| 8,140,566 | B2 | 3/2012 | Boerries et al. |
| 8,145,791 | B2 | 3/2012 | Thatcher et al. |
| 8,151,358 | B1 | 4/2012 | Herold |
| 8,161,122 | B2 | 4/2012 | Sood et al. |
| 8,200,761 | B2 | 6/2012 | Tevanian |
| 8,200,808 | B2 | 6/2012 | Ishida |
| 8,204,897 | B1 | 6/2012 | Djabarov et al. |
| 8,239,197 | B2 | 8/2012 | Webb et al. |
| 8,244,848 | B1 | 8/2012 | Narayanan et al. |
| 8,271,025 | B2 | 9/2012 | Brisebois et al. |
| 8,284,783 | B1 | 10/2012 | Maufer et al. |
| 8,291,019 | B1 | 10/2012 | Rochelle et al. |
| 8,296,179 | B1 | 10/2012 | Rennison |
| 8,316,315 | B2 | 11/2012 | Portnoy et al. |
| 8,363,803 | B2 | 1/2013 | Gupta |
| 8,365,235 | B2 | 1/2013 | Hunt et al. |
| 8,392,409 | B1 | 3/2013 | Kashyap et al. |
| 8,392,836 | B1 | 3/2013 | Bau et al. |
| 8,412,174 | B2 | 4/2013 | Khosravi |
| 8,423,545 | B2 | 4/2013 | Cort et al. |
| 8,433,762 | B1 | 4/2013 | Wald et al. |
| 8,443,441 | B2 | 5/2013 | Stolfo et al. |

(56) References Cited

U.S. PATENT DOCUMENTS

| | | |
|---|---|---|
| 8,447,789 B2 | 5/2013 | Geller |
| 8,452,745 B2 | 5/2013 | Ramakrishna |
| 8,463,872 B2 | 6/2013 | Pounds et al. |
| 8,468,168 B2 | 6/2013 | Brezina et al. |
| 8,495,045 B2 | 7/2013 | Wolf et al. |
| 8,510,389 B1 | 8/2013 | Gurajada et al. |
| 8,522,257 B2 | 8/2013 | Rupp et al. |
| 8,549,412 B2 | 10/2013 | Brezina et al. |
| 8,566,306 B2 | 10/2013 | Jones |
| 8,600,343 B2 | 12/2013 | Brezina et al. |
| 8,606,335 B2 | 12/2013 | Ozaki |
| 8,620,935 B2 | 12/2013 | Rubin et al. |
| 8,661,002 B2 | 2/2014 | Smith et al. |
| 8,666,035 B2 | 3/2014 | Timmins et al. |
| 8,694,633 B2 | 4/2014 | Mansfield et al. |
| 8,745,060 B2 | 6/2014 | Brezina et al. |
| 8,768,291 B2 | 7/2014 | Williams et al. |
| 8,793,625 B2 | 7/2014 | Rhee et al. |
| 8,818,995 B1 | 8/2014 | Guha |
| 8,849,816 B2 | 9/2014 | Burba et al. |
| 8,930,463 B2 | 1/2015 | Bonforte et al. |
| 8,972,257 B2 * | 3/2015 | Bonforte ............... H04W 4/21 704/235 |
| 8,984,074 B2 | 3/2015 | Monaco |
| 8,990,323 B2 | 3/2015 | Hein et al. |
| 9,009,065 B2 | 4/2015 | Reis et al. |
| 9,020,938 B2 | 4/2015 | Cort et al. |
| 9,058,366 B2 | 6/2015 | Brezina et al. |
| 9,069,825 B1 | 6/2015 | Chang |
| 9,087,323 B2 | 7/2015 | Hein et al. |
| 9,159,057 B2 | 10/2015 | Monaco |
| 9,195,753 B1 | 11/2015 | King et al. |
| 9,195,969 B2 | 11/2015 | Bau et al. |
| 9,235,848 B1 | 1/2016 | Gourley et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 9,304,621 B1 | 4/2016 | Wakim et al. |
| 9,501,561 B2 | 11/2016 | Rubin et al. |
| 9,569,529 B2 | 2/2017 | Rubin et al. |
| 9,584,343 B2 | 2/2017 | Brezina et al. |
| 9,591,086 B2 | 3/2017 | Brezina et al. |
| 9,594,832 B2 | 3/2017 | Rubin et al. |
| 9,596,308 B2 | 3/2017 | Brezina et al. |
| 9,685,158 B2 * | 6/2017 | Bonforte ............... H04W 4/21 |
| 9,699,258 B2 | 7/2017 | Brezina et al. |
| 9,716,764 B2 | 7/2017 | Brezina et al. |
| 9,721,228 B2 | 8/2017 | Cort et al. |
| 9,747,583 B2 | 8/2017 | Monaco |
| 9,800,679 B2 | 10/2017 | Hein et al. |
| 9,819,765 B2 | 11/2017 | Thatcher et al. |
| 9,842,144 B2 | 12/2017 | Cort et al. |
| 9,842,145 B2 | 12/2017 | Cort et al. |
| 9,954,963 B2 | 4/2018 | Brezina et al. |
| 10,089,986 B2 | 10/2018 | Bonforte |
| 2001/0037407 A1 | 11/2001 | Dragulev et al. |
| 2001/0049628 A1 | 12/2001 | Icho |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1 | 6/2002 | Kremer et al. |
| 2002/0076004 A1 | 6/2002 | Brockenbrough et al. |
| 2002/0078090 A1 | 6/2002 | Hwang et al. |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0152216 A1 | 10/2002 | Bouthors |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1 | 2/2003 | Mansfield |
| 2003/0093483 A1 | 5/2003 | Allen et al. |
| 2003/0114956 A1 | 6/2003 | Cullen et al. |
| 2003/0120608 A1 | 6/2003 | Pereyra |
| 2003/0142125 A1 | 7/2003 | Salmimaa et al. |
| 2003/0167324 A1 | 9/2003 | Farnham et al. |
| 2003/0195937 A1 | 10/2003 | Kircher, Jr. et al. |
| 2003/0204439 A1 | 10/2003 | Cullen, III |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015547 A1 | 1/2004 | Griffin et al. |
| 2004/0015554 A1 | 1/2004 | Wilson |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0133561 A1 | 7/2004 | Burke |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0210827 A1 | 10/2004 | Burg et al. |
| 2004/0215726 A1 | 10/2004 | Arning et al. |
| 2004/0260756 A1 | 12/2004 | Forstall et al. |
| 2004/0268229 A1 | 12/2004 | Paoli et al. |
| 2005/0015432 A1 | 1/2005 | Cohen |
| 2005/0027779 A1 | 2/2005 | Schinner |
| 2005/0038687 A1 | 2/2005 | Galdes |
| 2005/0044152 A1 | 2/2005 | Hardy et al. |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0080868 A1 | 4/2005 | Malik |
| 2005/0091272 A1 | 4/2005 | Smith et al. |
| 2005/0091314 A1 | 4/2005 | Blagsvedt et al. |
| 2005/0102257 A1 | 5/2005 | Onyon et al. |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004713 A1 | 1/2006 | Korte et al. |
| 2006/0004892 A1 | 1/2006 | Lunt et al. |

(56) References Cited

U.S. PATENT DOCUMENTS

| | | |
|---|---|---|
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0083357 A1 | 4/2006 | Howell et al. |
| 2006/0083358 A1 | 4/2006 | Fong et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101350 A1 | 5/2006 | Scott |
| 2006/0123357 A1 | 6/2006 | Okamura |
| 2006/0136494 A1 | 6/2006 | Oh |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0265460 A1 | 11/2006 | Kiyohara |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050455 A1 | 3/2007 | Yach et al. |
| 2007/0060328 A1 | 3/2007 | Zrike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118533 A1 | 5/2007 | Ramer et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0198500 A1 | 8/2007 | Lucovsky et al. |
| 2007/0203991 A1 | 8/2007 | Fisher et al. |
| 2007/0208802 A1 | 9/2007 | Barman et al. |
| 2007/0214141 A1 | 9/2007 | Sittig et al. |
| 2007/0218900 A1 | 9/2007 | Abhyanker |
| 2007/0244881 A1 | 10/2007 | Cha et al. |
| 2007/0244977 A1 | 10/2007 | Atkins |
| 2007/0250585 A1 | 10/2007 | Ly et al. |
| 2007/0255794 A1 | 11/2007 | Coutts |
| 2007/0271527 A1 | 11/2007 | Paas et al. |
| 2007/0273517 A1 | 11/2007 | Govind |
| 2007/0282956 A1 | 12/2007 | Staats |
| 2007/0288578 A1 | 12/2007 | Pantalone |
| 2007/0294281 A1 | 12/2007 | Ward et al. |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth et al. |
| 2008/0040435 A1 | 2/2008 | Buschi et al. |
| 2008/0040474 A1 | 2/2008 | Zuckerberg et al. |
| 2008/0040475 A1 | 2/2008 | Bosworth et al. |
| 2008/0055263 A1 | 3/2008 | Lemay et al. |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0147810 A1 | 6/2008 | Kumar et al. |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0189122 A1 | 8/2008 | Coletrane et al. |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0242277 A1 | 10/2008 | Chen et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0290987 A1 | 11/2008 | Li |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307066 A1 | 12/2008 | Amidon et al. |
| 2008/0319943 A1 | 12/2008 | Fischer |
| 2009/0005076 A1 | 1/2009 | Forstall et al. |
| 2009/0006366 A1 | 1/2009 | Johnson et al. |
| 2009/0010353 A1 | 1/2009 | She et al. |
| 2009/0029674 A1 | 1/2009 | Brezina et al. |
| 2009/0030773 A1 | 1/2009 | Kamhoot |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo et al. |

(56) References Cited

U.S. PATENT DOCUMENTS

| | | |
|---|---|---|
| 2009/0076795 A1 | 3/2009 | Bangalore et al. |
| 2009/0077026 A1 | 3/2009 | Yanagihara |
| 2009/0082038 A1 | 3/2009 | McKiou et al. |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0119678 A1 | 5/2009 | Shih et al. |
| 2009/0138546 A1 | 5/2009 | Cruzada |
| 2009/0150251 A1 | 6/2009 | Zhitomirsky |
| 2009/0156170 A1 | 6/2009 | Rossano et al. |
| 2009/0157717 A1 | 6/2009 | Palahnuk et al. |
| 2009/0171930 A1 | 7/2009 | Vaughan et al. |
| 2009/0171979 A1 | 7/2009 | Lubarski et al. |
| 2009/0174680 A1 | 7/2009 | Anzures et al. |
| 2009/0177754 A1 | 7/2009 | Brezina et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0209286 A1 | 8/2009 | Bentley et al. |
| 2009/0213088 A1 | 8/2009 | Hardy et al. |
| 2009/0217178 A1 | 8/2009 | Niyogi et al. |
| 2009/0228555 A1 | 9/2009 | Joviak et al. |
| 2009/0234815 A1 | 9/2009 | Boerries et al. |
| 2009/0234925 A1 | 9/2009 | Seippel, III et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0328161 A1 | 12/2009 | Puthenkulam et al. |
| 2010/0009332 A1 | 1/2010 | Yaskin et al. |
| 2010/0015954 A1 | 1/2010 | Yang |
| 2010/0030715 A1 | 2/2010 | Eustice et al. |
| 2010/0036833 A1 | 2/2010 | Yeung et al. |
| 2010/0049534 A1 | 2/2010 | Whitnah et al. |
| 2010/0057858 A1 | 3/2010 | Shen et al. |
| 2010/0057859 A1 | 3/2010 | Shen et al. |
| 2010/0062753 A1 | 3/2010 | Wen et al. |
| 2010/0070875 A1 | 3/2010 | Turski et al. |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0100899 A1 | 4/2010 | Bradbury et al. |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1 | 6/2010 | Felt et al. |
| 2010/0164957 A1 | 7/2010 | Lindsay et al. |
| 2010/0167700 A1 | 7/2010 | Brock et al. |
| 2010/0169327 A1 | 7/2010 | Lindsay et al. |
| 2010/0174784 A1 | 7/2010 | Levey et al. |
| 2010/0185610 A1 | 7/2010 | Lunt et al. |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229223 A1 | 9/2010 | Shepard et al. |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0275128 A1 | 10/2010 | Ward et al. |
| 2010/0281535 A1 | 11/2010 | Perry, Jr. et al. |
| 2010/0306185 A1 | 12/2010 | Smith et al. |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1 | 3/2011 | Rashad et al. |
| 2011/0086627 A1 | 4/2011 | Khosravi |
| 2011/0087969 A1 | 4/2011 | Hein et al. |
| 2011/0145192 A1 | 6/2011 | Quintela et al. |
| 2011/0145219 A1 | 6/2011 | Cierniak et al. |
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort et al. |
| 2011/0196802 A1 | 8/2011 | Ellis et al. |
| 2011/0201275 A1 | 8/2011 | Jabara et al. |
| 2011/0202532 A1 | 8/2011 | Nakazawa et al. |
| 2011/0219317 A1 | 9/2011 | Thatcher et al. |
| 2011/0225293 A1 | 9/2011 | Rathod |
| 2011/0231407 A1 | 9/2011 | Gupta et al. |
| 2011/0235790 A1 | 9/2011 | Strope et al. |
| 2011/0252383 A1 | 10/2011 | Miyashita |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer et al. |
| 2011/0298701 A1 | 12/2011 | Holzer et al. |
| 2012/0011204 A1 | 1/2012 | Morin et al. |
| 2012/0017158 A1 | 1/2012 | Maguire et al. |
| 2012/0036254 A1 | 2/2012 | Onuma |
| 2012/0041907 A1 | 2/2012 | Wang et al. |
| 2012/0054681 A1 | 3/2012 | Cort et al. |
| 2012/0079023 A1 | 3/2012 | Tejada-Gamero et al. |
| 2012/0084461 A1 | 4/2012 | Athias et al. |
| 2012/0089678 A1 | 4/2012 | Cort et al. |
| 2012/0089690 A1 | 4/2012 | Hein et al. |
| 2012/0110080 A1 | 5/2012 | Panyam et al. |
| 2012/0110096 A1 | 5/2012 | Smarr et al. |
| 2012/0150970 A1 | 6/2012 | Peterson et al. |
| 2012/0150978 A1 | 6/2012 | Monaco et al. |
| 2012/0150979 A1 | 6/2012 | Monaco |
| 2012/0166999 A1 | 6/2012 | Thatcher et al. |
| 2012/0197871 A1 | 8/2012 | Mandel et al. |
| 2012/0198348 A1 | 8/2012 | Park |
| 2012/0246065 A1 | 9/2012 | Yarvis et al. |
| 2012/0259834 A1 | 10/2012 | Broder et al. |
| 2012/0271822 A1 | 10/2012 | Schwendimann et al. |
| 2012/0278428 A1 | 11/2012 | Harrison et al. |
| 2012/0330658 A1 | 12/2012 | Bonforte |
| 2012/0330980 A1 | 12/2012 | Rubin et al. |
| 2012/0331418 A1 | 12/2012 | Bonforte |
| 2013/0007627 A1 | 1/2013 | Monaco |
| 2013/0014021 A1 | 1/2013 | Bau et al. |
| 2013/0080915 A1 | 3/2013 | Lewis et al. |
| 2013/0091288 A1 | 4/2013 | Shalunov et al. |
| 2013/0120444 A1 | 5/2013 | Allyn et al. |
| 2013/0173712 A1 | 7/2013 | Monjas Llorente et al. |
| 2013/0246931 A1 | 9/2013 | Harris et al. |
| 2013/0260795 A1 | 10/2013 | Papakipos et al. |
| 2014/0011481 A1 | 1/2014 | Kho |
| 2014/0081914 A1 | 3/2014 | Smith et al. |
| 2014/0081964 A1 | 3/2014 | Rubin et al. |
| 2014/0087687 A1 | 3/2014 | Brezina et al. |
| 2014/0089304 A1 | 3/2014 | Rubin et al. |
| 2014/0089411 A1 | 3/2014 | Rubin et al. |
| 2014/0095433 A1 | 4/2014 | Cort et al. |
| 2014/0100861 A1 | 4/2014 | Ledet |
| 2014/0115086 A1 | 4/2014 | Chebiyyam |
| 2014/0156650 A1 | 6/2014 | Jacobson |
| 2014/0207761 A1 | 7/2014 | Brezina et al. |
| 2014/0214981 A1 | 7/2014 | Mallet et al. |
| 2014/0280094 A1 | 9/2014 | Brandstetter |
| 2014/0280097 A1 | 9/2014 | Lee et al. |
| 2014/0287786 A1 | 9/2014 | Bayraktar et al. |
| 2015/0074213 A1 | 3/2015 | Monaco |
| 2015/0170650 A1 | 6/2015 | Bonforte |

(56) References Cited

U.S. PATENT DOCUMENTS

| | | | |
|---|---|---|---|
| 2015/0222719 | A1 | 8/2015 | Hein et al. |
| 2016/0070787 | A1 | 3/2016 | Brezina et al. |
| 2016/0147899 | A1 | 5/2016 | Smith et al. |
| 2016/0182661 | A1 | 6/2016 | Brezina et al. |
| 2017/0147699 | A1 | 5/2017 | Rubin et al. |
| 2017/0171124 | A1 | 6/2017 | Brezina et al. |
| 2017/0187663 | A1 | 6/2017 | Brezina et al. |
| 2017/0287483 | A1 | 10/2017 | Bonforte |
| 2017/0302749 | A1 | 10/2017 | Brezina et al. |
| 2017/0324821 | A1 | 11/2017 | Brezina et al. |
| 2017/0337514 | A1 | 11/2017 | Cort et al. |
| 2018/0046985 | A1 | 2/2018 | Monaco |
| 2018/0095970 | A1 | 4/2018 | Cort et al. |

FOREIGN PATENT DOCUMENTS

| | | |
|---|---|---|
| EP | 944002 | 9/1999 |
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 2003098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

"The Ultimate Guide for Everything Twitter", Webdesigner Depot, archive.org webpage https://web.archive.org/web/20090325042115/http://www.webdesignerdepot.com/2009/03/the-ultimate-guide-for-everything-twitter/ from Mar. 25, 2009.

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).

Elsayed, Tamer et al., "Personal Name Resolution in Email: A Heuristic Approach," University of Maryland Technical Report No. TR-LAMP-150, Mar. 17, 2008.

Epstein, "Harnessing User Data to Improve Facebook Features", Doctoral dissertation, Boston College, May 12, 2010.

European Patent Application No. 11849271.9, Extended Search Report, dated Apr. 3, 2014.

European Patent Application No. 12801970.0, Extended Search Report, dated Oct. 23, 2014.

European Patent Application 12801998.1, Extended Search Report, dated Feb. 10, 2015.

European Patent Application No. 10797483.4, extended European Search Report, dated Dec. 20, 2016.

Extended European Search Report, EP 10 78 3783, dated Mar. 24, 2014.

Fitzpatrick, Brad, "AddressBooker," Github Social Coding, located at http://addressbooker.appspot.com/, Nov. 28, 2008 (document provided includes third-party comments submitted under the USPTO PeerToPatent program).

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).

Hannon et al., "Recommending Twitter Users to Follow Using Content and Collaborative Filtering Approaches", RecSys2010, Sep. 26-30, 2010, Barcelona, Spain.

International Patent Application PCT/US10/34782, International Search Report and Written Opinion, dated Dec. 22, 2010.

International Patent Application PCT/US10/35405, International Search Report and Written Opinion, dated Jan. 3, 2011.

International Patent Application PCT/US10/52081, International Search Report and Written Opinion, dated May 20, 2011.

International Patent Application PCT/US10/56560, International Search Report and Written Opinion, dated Jun. 21, 2011.

International Patent Application PCT/US11/64958, International Search Report and Written Opinion, dated Jul. 31, 2012.

International Patent Application PCT/US12/043523, International Search Report and Written Opinion, dated Nov. 28, 2012.

International Patent Application PCT/US2011/064892, International Search Report and Written Opinion, dated Aug. 22, 2012.

International Patent Application PCT/US2012/043507, International Search Report and Written Opinion, dated Jan. 3, 2013.

Microsoft Corporation, "About AutoComplete Name Suggesting," Microsoft Outlook 2003 help forum, located at http://office.microsoft.com/en-us/outlook/HP063766471033.aspx, 2003.

Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.

OpenSocial Foundation, "Social Application Tutorial (v0.9)," located at http://wiki.opensocial.org/index.php?title=Social_Application_Tutorial, accessed Oct. 8, 2010.

PCWorld Communications, Inc., "Your Contacts are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).

U.S. Appl. No. 61/407,018, filed Oct. 27, 2010.

W3i, LLC, "Advertiser Feedback System (AFS)," company product description. Sep. 22, 2009.

Wikimedia Foundation, Inc., "Machine Learning," Wikipedia encyclopedia entry located at http://en.wikipedia.org/wiki/Machine_learning, Jan. 30, 2011.

\* cited by examiner

SYSTEMS AND METHODS TO PRESENT VOICE MESSAGE INFORMATION TO A USER OF A COMPUTING DEVICE

CROSS-REFERENCE TO RELATED APPLICATIONS

The present application is a continuation of and claims the benefit of U.S. Pat. No. 10,089,986, filed Jun. 20, 2017, which is a continuation of and claims the benefit of U.S. Pat. No. 9,685,158, filed Feb. 27, 2015, which is a continuation of and claims the benefit of U.S. Pat. No. 8,972,257, filed Jun. 20, 2012, which claims the benefit of U.S. Provisional Application Ser. No. 61/499,643, filed Jun. 21, 2011, entitled "Systems and Methods to Present Voice Message Information to a User of a Computing Device," by J. Bonforte, all of which are hereby incorporated by reference herein in their entirety.

The present application is related to U.S. patent application Ser. No. 12/792,698, filed Jun. 2, 2010, entitled "SELF POPULATING ADDRESS BOOK," by Smith et al., which was also published as U.S. Patent Publication No. 2010/0306185 on Dec. 2, 2010, the entire contents of which application is incorporated by reference as if fully set forth herein.

FIELD OF THE TECHNOLOGY

At least some embodiments disclosed herein relate to information processing systems in general, and more particularly, but not limited to, processing and/or presentation of information relating to or regarding voice messages, for a user of a computing device, that are received from other persons (e.g., persons having called the user).

BACKGROUND

Users of mobile devices such as Android and iPhone devices typically receive voice messages from other persons (e.g., friends or business associates). When the user of the mobile device is not available, the caller often leaves a voice message. The user in many cases may have numerous voice messages to review, and may desire to take follow-up action after reviewing one or more of these messages.

SUMMARY OF THE DESCRIPTION

Systems and methods to process and/or present information for a user regarding voice messages received from other persons are described herein. Some embodiments are summarized in this section.

In one embodiment, a method includes: receiving first data associated with prior communications or activities for a first user on a mobile device of the first user; receiving, via a computing apparatus, a voice message for the first user; transcribing, via the computing apparatus, the voice message using the first data to provide a transcribed message; and sending the transcribed message to the mobile device for display to the user.

In another embodiment, a method includes causing a mobile device of a first user to: send, using the mobile device, first data to a computing apparatus, wherein the first data is associated with prior communications or activities for the first user on the mobile device; send, using the mobile device, a voice message for the first user to the computing apparatus; and receive, at the mobile device, a transcribed message from the computing apparatus, wherein the computing apparatus has transcribed the voice message using the first data to create the transcribed message.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a computing device (e.g., a mobile device) owned by a user stores data (e.g., in a database in the form of person profiles) associated with prior communications and/or other activity of the user on the mobile device (e.g., data extracted from prior emails received by the user). A caller calls the mobile device and leaves a voice message for the user. The caller is identified (e.g., using caller ID). A subset of social and/or other data associated with the caller is retrieved from the database of the user (e.g., a person profile of the caller and/or a predefined number of the most recent emails sent by the caller to the person). This subset of data is used by a speech recognition system to transcribe the voice message. The transcribed message is provided to the user on a display of the mobile device.

In another embodiment, the user is further presented with a list of persons and/or emails or other communications that have been referenced in the transcribed message. For example, person profiles (or a link to each thereto) for two friends mentioned in the transcribed message may be displayed to the user on the same screen or page as the transcribed message. Also, a link to an email referenced by the caller in the transcribed message may be displayed on the same page or on another page (e.g., accessible by a link or icon on the page with the transcribed message).

Numerous examples of various types of data (e.g., person profiles for callers associated with the user) that may be collected in such a database (or collected in another form of data repository) for the user are described in U.S. patent application Ser. No. 14/792,698, incorporated by reference above.

In one embodiment, a mobile device of a user stores data (e.g., in a database in the form of person profiles) associated with prior communications and/or other activity of the user on the mobile device (e.g., data extracted from one of more of the following: prior communications such as email or text messages, voice messages, or other documents or information received by the user from the user's friends or other persons such as work associates). The other activity may include the manner or ways in which the user operates the mobile device (e.g., what buttons or functions or activated when the user has previously interacted with the caller, what online service is used by the user when previously interacting with the caller, etc.).

A caller calls the mobile device and leaves a voice message for the user. The caller is identified (e.g., using caller ID). A subset of social and/or other data associated with the caller is retrieved from the database of the user (e.g., a person profile of the caller and/or a predefined number of the most recent emails sent by the caller to the person profiles). In one embodiment, the subset of data and the identification of the caller are sent to a speech-to-text service (e.g., an online service) along with the voice message to be transcribed. This subset of data is used by the speech recognition service system to transcribe the voice message. The transcribed message is provided to the user on a display of the mobile device.

Figure 1:
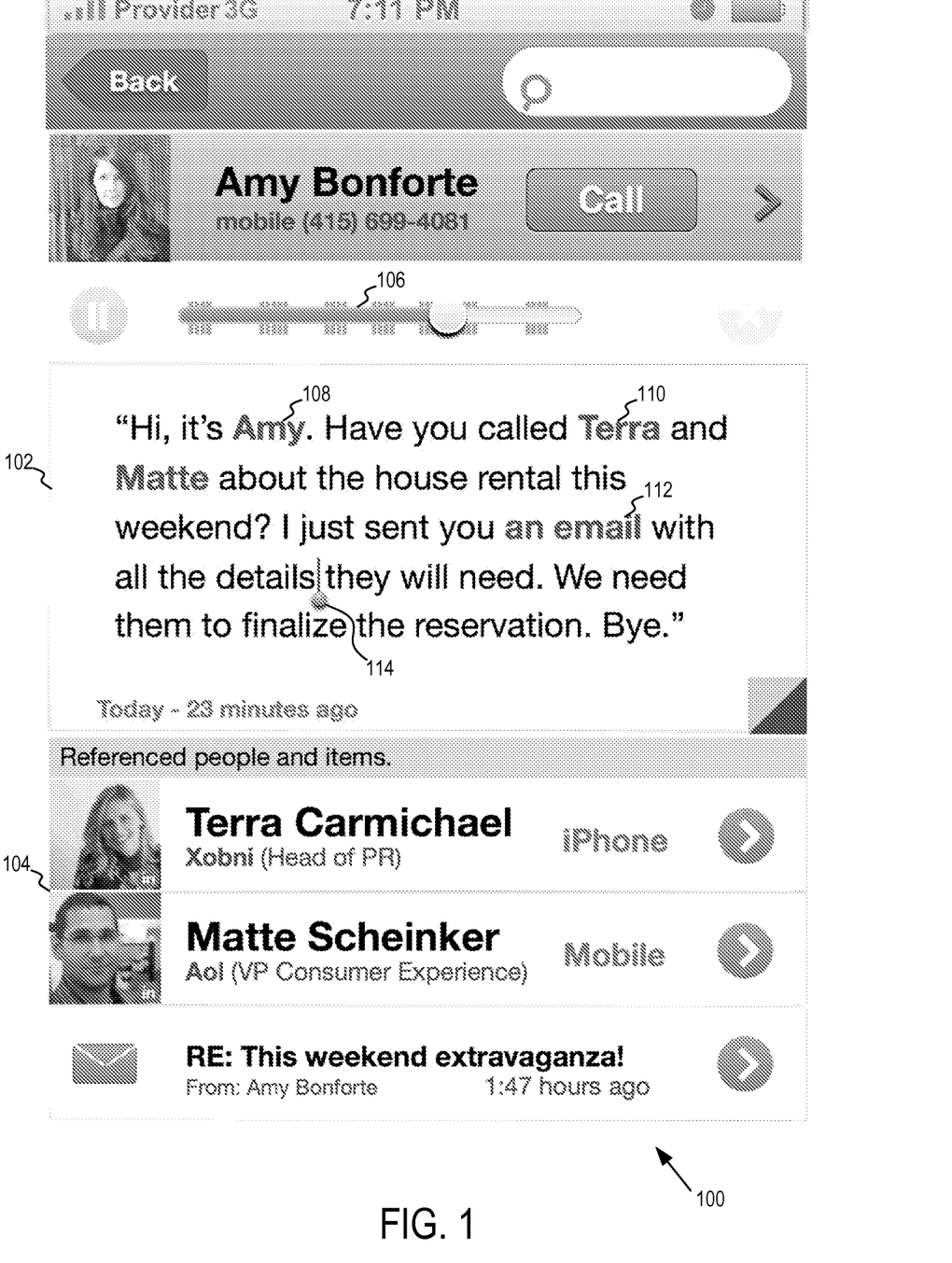
FIG. 1 shows an example of a display screen provided to a user of a mobile device for reviewing voice messages according to one embodiment.

FIG. 1 shows an example of a display screen 100 provided to a user of a mobile device for reviewing voice messages (e.g., a message from Amy Bonforte) according to one embodiment. A voice message from Amy (left for the user, who may have been unavailable or not aware of the call from Amy) has been transcribed as described above and a transcription 102 is presented under Amy's name.

When a voice message is being reviewed, a visual indicator 106 indicates progress of the playing of the message. Also, a visual cursor 114 indicates the position in the transcribed message for the words that are then being heard by the user during the playing.

The transcription 102 is generated by a speech recognition system using a subset of the user's social data that is sent to the system prior to transcription. This subset of data is collected (e.g., by a server associated with the mobile device) after the voice message from Amy has been recorded. The subset may include a person profile for Amy (which includes the correct spelling of Amy's name), recent emails sent by Amy to the user, and person profiles for other persons that Amy and the caller have in common (e.g., other persons that have been cc'd on emails between Amy and the user).

The speech recognition system uses the subset of social data for transcribing this particular voice message. As other voice messages for the user arrive and need transcription, a new and different subset of data is selected and sent to the speech recognition service for use in transcription of the corresponding voice message. Thus, in one embodiment, each subset of data may be unique for each voice message to be transcribed, though this is not required. Each subset of data may be sent to the speech recognition service from the server associated with the mobile phone that is storing an implicit social graph for the user, or may be sent directly from the mobile device.

The caller's name 108 ("Amy") is correctly transcribed from use of the caller name data provided to the transcription service. The two friends 110 (Terra and Matte), although not previously known to the transcription service, are transcribed with correct spelling using the subset of data provided from the user's social data database for use in transcription.

The transcribed message mentions an email 112 (which could be other forms of prior communication). Triggered by the use of this word "email", the system uses correlation or other matching techniques to select prior emails from the caller to the user that are most closely associated with this message (e.g., by correlation of words in the message to words in prior emails and/or by the time that has passed since a prior email was sent to the user; also, a ranking system based on relevancy may be used). The single or multiple emails selected as being most relevant are presented in list 104 (along with other relevant information referenced in the message).

Links 104 may also include links to contact, person profile or other information for persons (e.g., Terra and Matte) that have been referenced in the transcribed message, and these links may be presented to the user in a display on the mobile device. The links to person and emails permits the user to click on a link 104 to initiate an action to contact the applicable person by phone or email.

Figure 2:
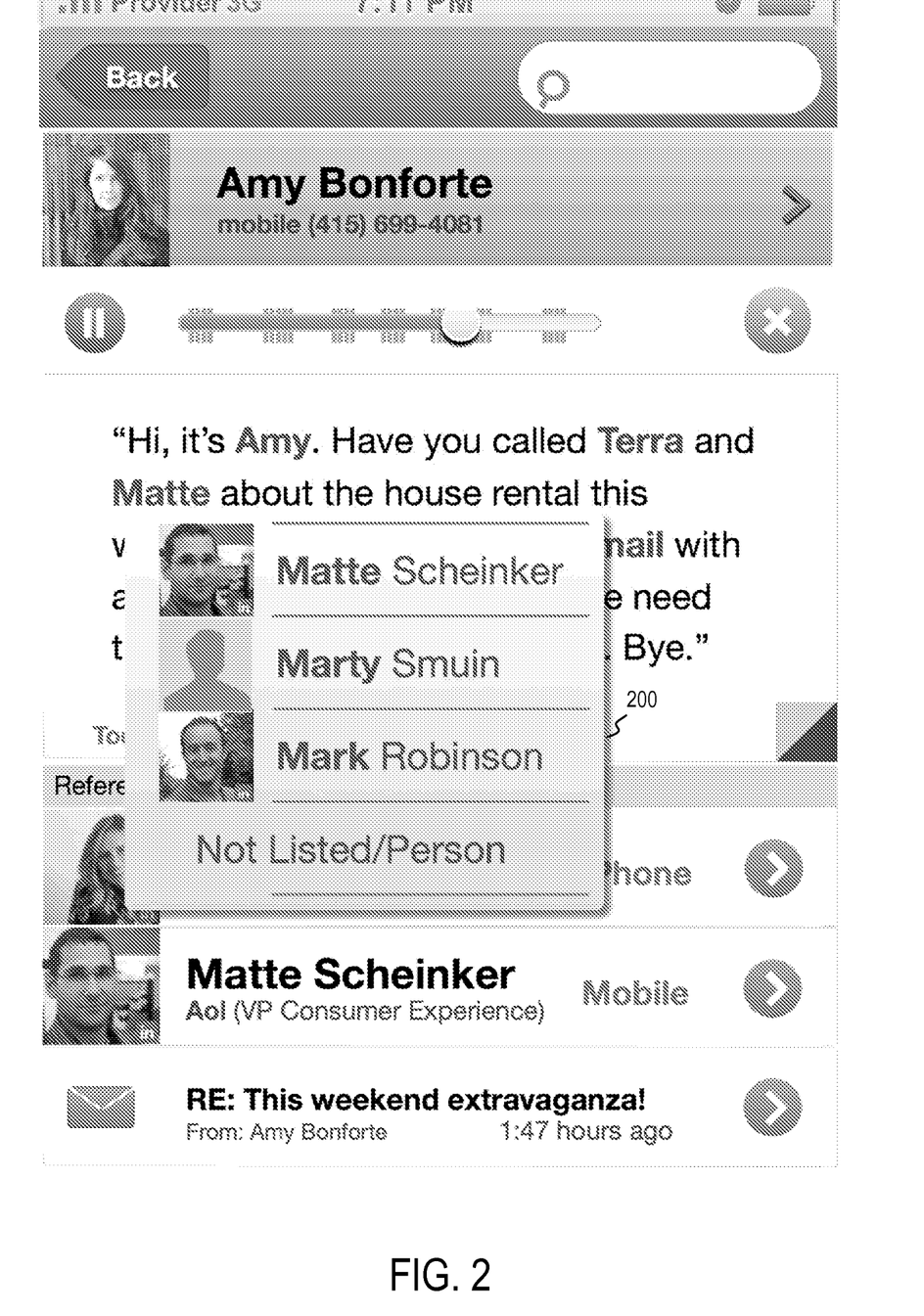
FIG. 2 shows an example of the display of several options for selection by the user for correcting misspelled words in the voice message of FIG. 1 according to one embodiment.

FIG. 2 shows an example of a display of several options 200 for selection by the user for correcting misspelled words in the voice message of FIG. 1 according to one embodiment. When the user reviews the transcribed message, the user may select a word such as "Matte" in order to provide a corrected spelling. The options 200 presented to the user for correction are selected, at least in part, from the subset of data sent to the transcription service for transcribing the voice message. If the user selects a different spelling, the speech recognition system stores that correction and uses it in future transcriptions (e.g., for future voice messages to the user from Amy or even other callers) to improve accuracy.

Figure 3:
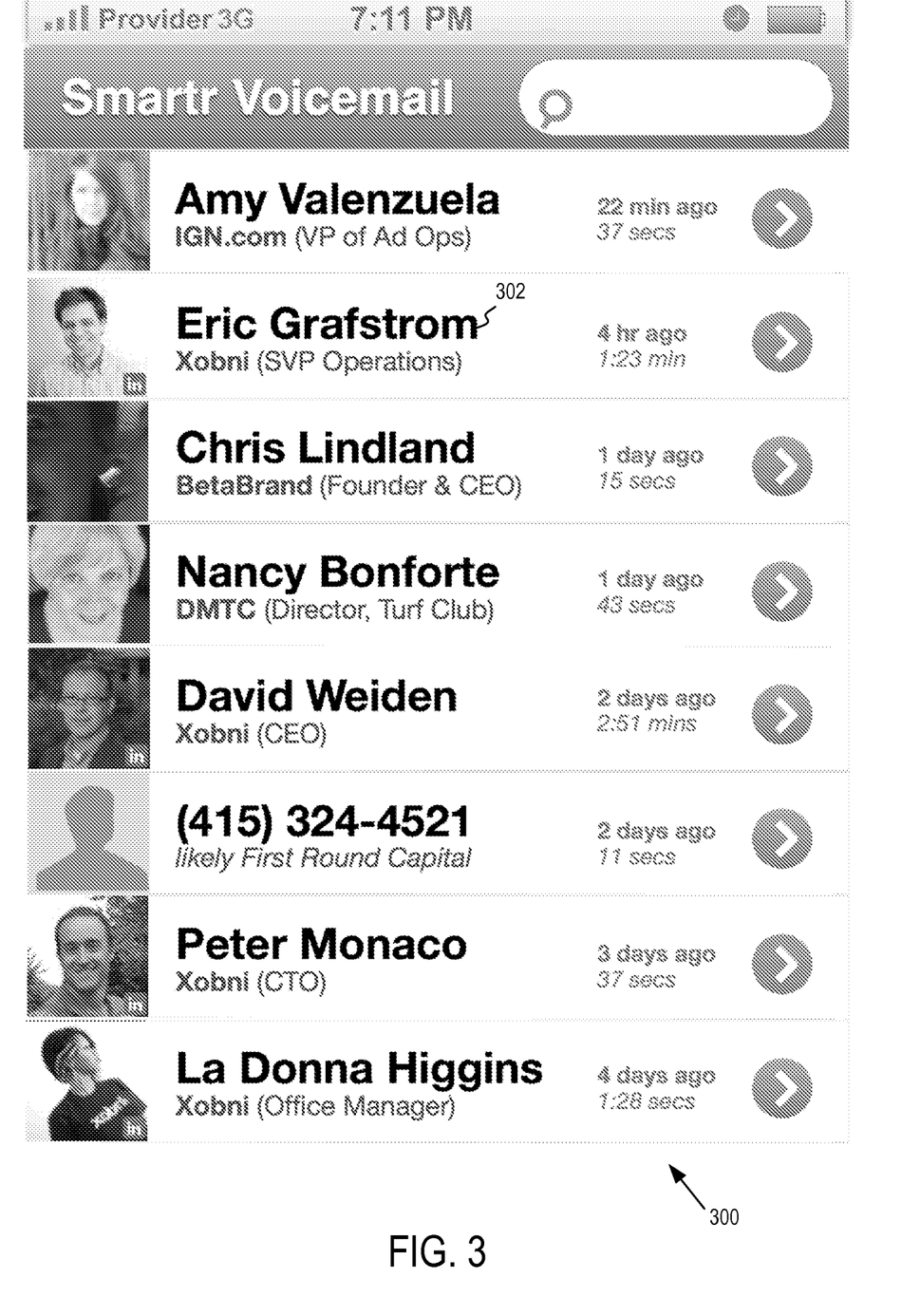
FIG. 3 shows an example of the display to the user of a list of voice messages awaiting review by the user according to one embodiment.

FIG. 3 shows an example of a display to the user of a list 300 of voice messages awaiting review by the user according to one embodiment. For example, voice message 302 has been transcribed using a subset of social graph data from the user's social database (e.g., stored on the server associated with the mobile device). In one embodiment, the list 300 may be presented in a ranked order based on relevancy to the user by ranking of the person associated with each voice message. For example, this ranking may be done as described for ranking of contacts in U.S. patent application Ser. No. 14/792,698, incorporated by reference above.

Additional specific, non-limiting examples of the transcription and presentation of voice messages are now discussed below. In a first example, the above approach is used to improve transcription services for voice messages as provided by a telecommunications carrier to its mobile phone subscribers (e.g., Apple iPhone or Android phone device subscribers using a voicemail system). A telecommunications carrier may use person profile and/or other implicit social graph data to improve its voicemail service. When a user receives a voicemail from a caller, caller ID information may be used to make an identification of the caller. This identification (optionally along with other information and/or predefined criteria) is used to select the subset of data from the social graph data to send to a transcription service (e.g., a service used regularly by the carrier).

In another example, when the voice message is left, the subset of data sent includes the name of the person that called, and also the names and other information for persons that the user and the caller both know in common (and that will likely appear in the voice message). A relevancy ranking of these persons may also be provided. This subset of data becomes part of the voice message metadata. So, when the voice message is run through speech recognition, accuracy for names and other information in the transcribed message is improved. Thus, a context associated with the user is provided to the speech recognition system in order to better interpret words in the transcribed message.

As illustrated in FIG. 1 above, names of friends are often included in voice messages, but such names are difficult to recognize by a voice processing system because the system has not previously learned these names. However, the approach described above may result in providing the correct spelling of such names in the transcribed message. The names of persons (or person profiles) selected for the subset of social data may be limited to a predefined number (e.g., 10 names).

The subset of data is sent to an online service on the Internet that does speech-to-text conversion. It takes the recorded voicemail message provided by the handset or the carrier, and does the transcription. The subset of data may be provided in a server-to-server manner or via the user's smart phone to the transcription server. The online service may generate the transcription and sends back the results as a text message or a webpage.

As mentioned above, the reference in a message to a prior communication (e.g., "I just sent you an email") may be used as a trigger for selecting certain types of information related to prior communications. For example, the subset of data may include all recent emails to and/or from the caller (and may include the subject lines for these emails) to aid in the transcription of factual or other information included in the voice message (e.g., the name of a performer or concert may not be known to the speech recognition, but may be included in a prior email). Words or other data used or associated with recent emails may significantly improve the ability to transcribe that word or other words in the transcribed message and thus increase accuracy.

In one example, the user interface permits the user to make corrections to the transcribed message, as discussed above. If a word is spelled incorrectly, the user may just tap on that word and briefly hold his finger down on the screen. Then, a list of relevant options for the user to select from appears (e.g., these options may be other likely synonyms from other people in the user's social graph such as other person names that sounded like "Matte" that the system might choose from in doing the transcription). This also improves the speech recognition system, which remembers the clip and the correction, and then this voice pattern maps more correctly in future transcriptions.

In another example, if the transcribed message references a prior email (e.g., "I just sent you an email ten minutes ago."), the subset of data may include people who were cc'd on prior emails over the last 10 or 30 minutes or other time period as an additional set of people (whether or not the people are highly correlated to the user) in order to provide additional information to the speech recognition system.

In another example, an email to a user will frequently include an introduction to a new person (e.g., "Hey Jeff, this is David. I just sent you an email introduction to Jacob, who is the founder of this start-up company I want you to talk to. Can you give Jacob a call."). The introductions are often followed by a phone call. The prior email is sent in the subset of data and the speech recognizer system has improved the accuracy in handling a name not previously encountered by the system. The subset of data may also include information from the user's database about the persons at the start-up company in order to get that particular transcription done more correctly.

In one example, the voicemail message is displayed to the user with the context (e.g., emails and contacts) believed to be referenced in the voicemail message.

In another example, based on the caller ID (from the mobile device or server having seen the caller's phone number before), the subset of data includes a small subset of the user's implicit graph, which is sent to the speech recognition system. In one example, the voice message may go simultaneously to the speech recognition system and to the user's phone. The user's smart phone can do some of the processing, but services that do voice message receipt and handling may do some or all of the processing.

For example, in a server-to-server case, the carrier sends a voice message to a service for transcription, but first pings the server associated with the user's mobile device (and storing the user's social graph) to indicate that the user got a voicemail from a particular telephone number. The server creates a subset of social data around that telephone number that includes people, phone numbers, etc., that may have been referenced as metadata. The transcription is sent back to the carrier, and the carrier sends the transcription to the mobile device.

In one example, the subset of data is highly targeted and highly tuned to this specific instance. The subset of data is also an implicit graph (derived by simply watching a user's prior communication habits). It does not need to be explicitly maintained like prior directory graphs.

Figure 4:
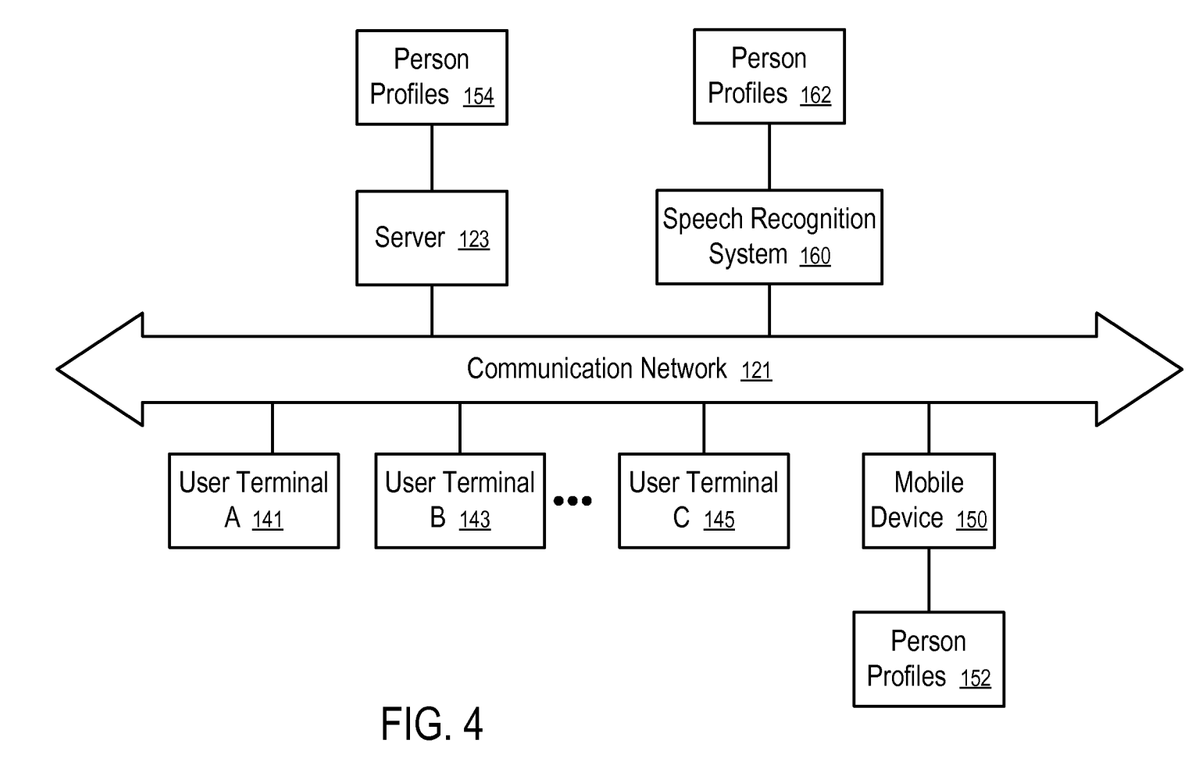
FIG. 4 shows a system to present voice message information to a user of a computing device according to one embodiment.

FIG. 4 shows a system to present voice message information to a user of a computing device (e.g., a mobile device 150 such as an iPhone device) according to one embodiment. In FIG. 4, the user terminals (e.g., 141, 143, . . . , 145) and/or mobile devices including mobile device 150 are used to access a server 123 over a communication network 121.

The server 123 may include one or more web servers (or other types of data communication servers) to communicate with the user terminals (e.g., 141, 143, . . . , 145) and/or mobile devices.

The server 123 may be connected to a data storage facility to store user provided content, such as multimedia content, navigation data, preference data, etc. The server 123 may also store or have access to stored person profiles 154.

Person profiles 154 may be created and updated based on email or other communications to and from mobile device 150 and other mobile devices of various users. In an alternative embodiment, person profiles 152 may be stored in a memory of mobile device 150. During operation, mobile device 150 may access and use person profiles obtained locally from mobile device 150 or obtained over communication network 121 from server 123.

When a voice message sent or addressed to the user of mobile device 150 is received, one or more person profiles and/or data as described herein may be sent along with the voice message to a speech recognition system 160 over a communication network 121 in order to be transcribed as discussed herein.

System 160 may store person profiles 162, which may include profiles received from mobile device 150 and/or server 123. Person profiles 162 may also be received from other computing devices not illustrated in FIG. 4.

Although FIG. 4 illustrates an example system implemented in client server architecture, embodiments of the disclosure can be implemented in various alternative architectures. For example, the system can be implemented via a peer to peer network of user terminals, where content and data are shared via peer to peer communication connections.

In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Figure 5:
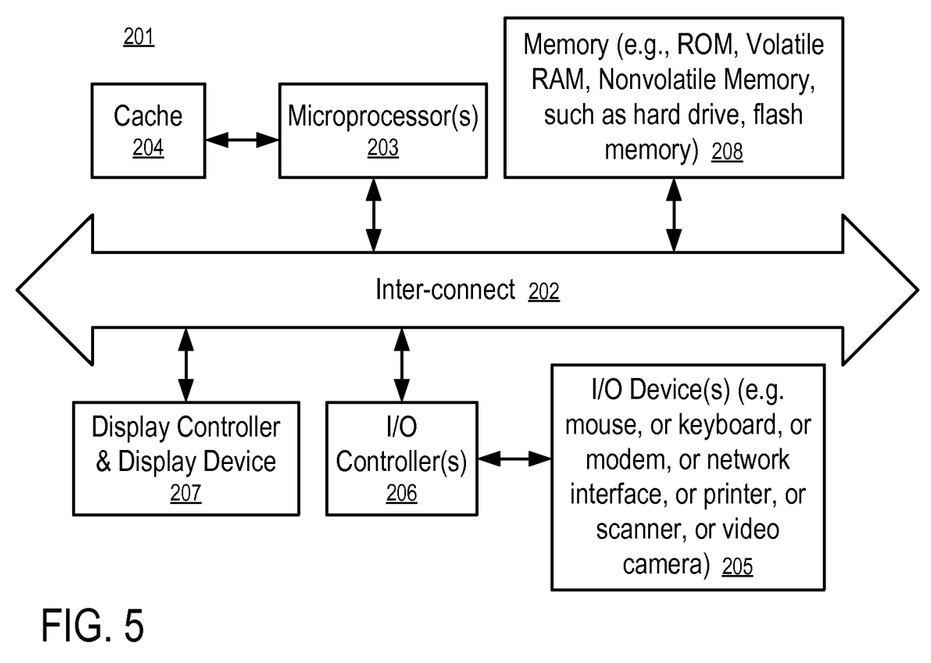
FIG. 5 shows a block diagram of a data processing system which can be used in various embodiments.

FIG. 5 shows a block diagram of a data processing system which can be used in various embodiments (e.g., to implement server 123 or speech recognition system 160). While FIG. 5 illustrates various components of a computer system, it is not intended to represent any particular architecture or manner of interconnecting the components. Other systems that have fewer or more components may also be used.

In FIG. 5, the system 201 includes an inter-connect 202 (e.g., bus and system core logic), which interconnects a microprocessor(s) 203 and memory 208. The microprocessor 203 is coupled to cache memory 204 in the example of FIG. 5.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used. In one embodiment, a data processing system as illustrated in FIG. 5 is used to implement a server or speech recognition system, and/or other servers.

In one embodiment, a data processing system as illustrated in FIG. 5 is used to implement a user terminal. A user terminal may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 6:
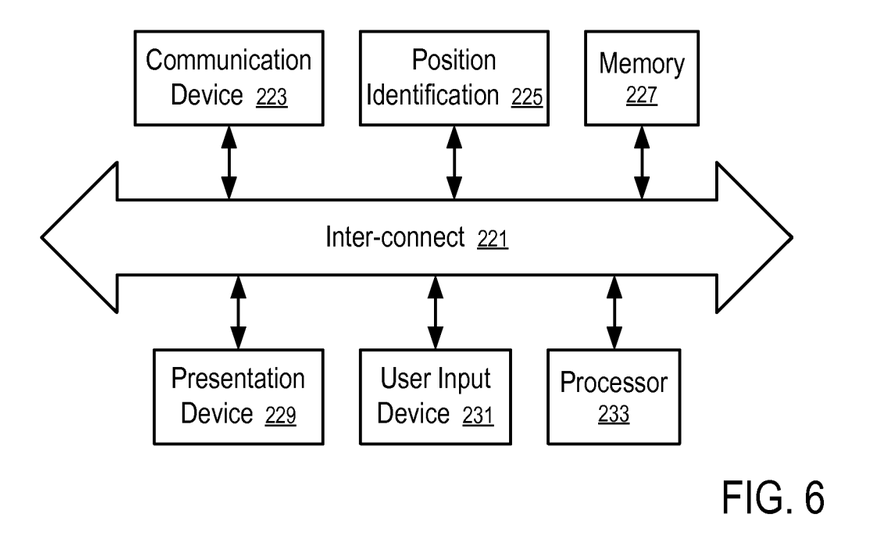
FIG. 6 shows a block diagram of a user device according to one embodiment.

FIG. 6 shows a block diagram of a user device (e.g., mobile device 150) according to one embodiment. In FIG. 6, the user device includes an inter-connect 221 connecting the presentation device 229, user input device 231, a processor 233, a memory 227, a position identification unit 225 and a communication device 223.

In FIG. 6, the position identification unit 225 is used to identify a geographic location for user content created for sharing. The position identification unit 225 may include a satellite positioning system receiver, such as a Global Positioning System (GPS) receiver, to automatically identify the current position of the user device.

In FIG. 6, the communication device 223 is configured to communicate with a server and/or speech recognition system. In one embodiment, the user input device 231 is configured to generate user data content. The user input device 231 may include a text input device, a still image camera, a video camera, and/or a sound recorder, etc.

Various further embodiments are now here described. In one embodiment, a method, comprises: receiving first data associated with prior communications or activities for a first user on a mobile device of the first user; receiving, via a computing apparatus, a voice message for the first user; transcribing, via the computing apparatus, the voice message using the first data to provide a transcribed message; and sending the transcribed message to the mobile device for display to the user.

In one embodiment, the first data comprises at least one person profile including a person profile for a caller that created the voice message. In one embodiment, the voice message is created by a caller, and the first data includes a predefined number of recent messages sent by the caller to the first user.

In one embodiment, the first data comprises a plurality of person profiles, including a person profile for a person referenced in the voice message other than the first user. In one embodiment, the voice message and the first data are received from the mobile device.

The first data may be received from a server, and the server may store a plurality of person profiles for users of mobile devices including the first user. The transcribing may be performed using a speech recognition system.

In one embodiment, the method further comprises sending, to the mobile device, a list of persons or messages for display to the first user, each person or message in the list being referenced in the transcribed message. In one embodiment the first data is associated with prior activities for the first user including manner of operation of the mobile device.

In one embodiment, the method further comprises sending, to the mobile device, a link to an email referenced in the transcribed message. The voice message may be created by a caller, and the method may further comprise sending a person profile to the mobile device for at least one person referenced in the transcribed message other than the caller.

In one embodiment, a non-transitory computer-readable storage medium stores computer-readable instructions, which when executed, cause a mobile device of a first user to: send, using the mobile device, first data to a computing apparatus, wherein the first data is associated with prior communications or activities for the first user on the mobile device; send, using the mobile device, a voice message for the first user to the computing apparatus; and receive, at the mobile device, a transcribed message from the computing apparatus, wherein the computing apparatus has transcribed the voice message using the first data to create the transcribed message.

In one embodiment, the first data comprises a plurality of person profiles, including a person profile for a person referenced in the voice message other than the first user, and the instructions further cause the mobile device to store the plurality of person profiles in a memory of the mobile device. In one embodiment, the instructions further cause the mobile device to send a person profile to a server other than the computing apparatus, wherein the server is configured to store a plurality of person profiles for users of mobile devices including the first user.

The computing apparatus may be a speech recognition system. The instructions may further cause the mobile device to receive person profiles for persons referenced in the transcribed message. The instructions may further cause the mobile device to present, on a display of the mobile device, a list of persons or messages to the first user, each person or message in the list being referenced in the transcribed message.

In one embodiment, a system comprises: at least one processor; and memory storing instructions configured to instruct the at least one processor to: receive first data associated with prior communications or activities for a first user on a mobile device of the first user; receive a voice message for the first user; transcribe the voice message using the first data to provide a transcribed message; and send the transcribed message to the mobile device for display to the user.

In one embodiment, the first data comprises at least one person profile including a person profile for a caller that created the voice message. In one embodiment, the first data is received from a server, and the server stores a plurality of person profiles for users of mobile devices including the first user.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving first data associated with prior communications for a first user of a computing device, the first data comprising a plurality of person profiles including a person profile for a person referenced in a prior communication between the first user and a caller that creates a voice message for the first user;
receiving, via a computing apparatus, the voice message;
transcribing, via the computing apparatus, the voice message using the first data to provide a transcribed message; and
sending the transcribed message to the computing device for providing to the first user.

2. The method of claim 1, wherein the plurality of person profiles further includes a person profile for a person referenced in the voice message other than the first user or the caller.

3. The method of claim 1, wherein the first data includes a predefined number of recent messages sent by the caller to the first user.

4. The method of claim 1, wherein the method further comprises sending a person profile to the computing device for at least one person referenced in the transcribed message other than the first user or the caller.

5. The method of claim 1, wherein the voice message and the first data are received from the computing device.

6. The method of claim 1, wherein the first data is received from a server, and wherein the server stores the plurality of person profiles for users of computing devices including the first user.

7. The method of claim 1, wherein the transcribing is performed using a speech recognition system.

8. The method of claim 1, further comprising sending, to the computing device, a list of persons or messages for display to the first user, wherein each person or message in the list is referenced in the transcribed message.

9. The method of claim 1, further comprising sending, to the computing device, a link to a communication referenced in the transcribed message.

10. The method of claim 1, wherein the first data is associated with prior activities of the first user, the prior activities including manner of operation by the first user of the computing device.

11. A non-transitory computer-readable storage medium storing computer-readable instructions, which when executed, cause a computing device of a first user to:
send, using the computing device, first data to a computing apparatus, wherein the first data is associated with prior communications for the first user, and the first data comprises a plurality of person profiles, including a person profile for a person referenced in a prior communication between the first user and a caller that creates a voice message for the first user;
send, using the computing device, the voice message to the computing apparatus; and
receive, at the computing device, a transcribed message from the computing apparatus, wherein the computing apparatus transcribes the voice message using the first data to create the transcribed message.

12. The storage medium of claim 11, wherein the plurality of person profiles further includes a person profile for a person referenced in the voice message other than the first user or the caller, and the instructions further cause the computing device to store the plurality of person profiles in a memory of the computing device.

13. The storage medium of claim 11, wherein the instructions further cause the computing device to send a person profile to a server other than the computing apparatus, wherein the server is configured to store the plurality of person profiles for users of computing devices including the first user.

14. The storage medium of claim 11, wherein the instructions further cause the computing device to receive person profiles for persons referenced in the transcribed message.

15. The storage medium of claim 11, wherein the instructions further cause the computing device to present, on a display, at least one person or message referenced in the transcribed message.

16. The storage medium of claim 11, wherein the computing apparatus is a speech recognition system.

17. The storage medium of claim 11, wherein the plurality of person profiles further includes a person profile for the caller.

18. A system, comprising:
at least one processor; and
memory storing instructions configured to instruct the at least one processor to:
receive first data associated with prior communications for a user of a computing device, the first data comprising data regarding a person referenced in a prior communication between the user and a caller;
receive a voice message created by the caller;
transcribe the voice message using the first data to provide a transcribed message; and
send the transcribed message to the computing device.

19. The system of claim 18, wherein the first data is received from a server, and the server stores profiles for users of computing devices including the user.

20. The system of claim 18, wherein the first data further includes data regarding the caller.

* * * * *